United States Patent [19]

Lake et al.

[11] 4,178,487

[45] Dec. 11, 1979

[54] SWITCH SELECTOR AND ACTUATOR

[75] Inventors: Don W. Lake, Cupertino; Nagaraja Subramanian, Mountain View, both of Calif.

[73] Assignee: Fairchild Camera and Instrument Corporation, Mountain View, Calif.

[21] Appl. No.: 913,405

[22] Filed: Jun. 7, 1978

[51] Int. Cl.² ............................................. H04M 1/42
[52] U.S. Cl. ............................ 179/90 BD; 179/90 B; 200/16 D; 200/257
[58] Field of Search ........... 179/90 B, 90 BD, 90 BB, 179/90 R, 1 SW; 200/16 R, 16 A, 16 D, 16 C, 175, 178, 252, 257, 290; 340/365 R

[56] References Cited
U.S. PATENT DOCUMENTS

| 3,118,976 | 1/1964 | Scott | 179/90 B |
|---|---|---|---|
| 3,120,582 | 2/1964 | Zanardo | 179/90 BB |
| 3,156,782 | 11/1964 | Kobler | 179/90 BB |
| 3,705,960 | 12/1972 | Evans et al. | 179/90 B |
| 3,712,960 | 1/1973 | Baron | 179/90 BD |
| 3,857,000 | 12/1974 | Boulanger | 200/16 D |

Primary Examiner—Gerald Brigance
Attorney, Agent, or Firm—Alan H. MacPherson; Paul J. Winters

[57] ABSTRACT

Disclosed is a switch selector and actuator for use with a telephone repertory dialer and the like where a plurality of contacts are arranged in a row. A rail member is mounted in close proximity to the row of switch contacts and is yieldably biased away from the contacts. A selector member is slidably mounted on the rail member and movable to select a switch contact to be engaged. By depressing the selector member and rail member the contact is engaged.

17 Claims, 3 Drawing Figures

SWITCH SELECTOR AND ACTUATOR

BACKGROUND OF THE INVENTION

1. Field of the Invention

This invention relates generally to electrical switches, and more particularly the invention relates to electrical switch apparatus having a plurality of contacts which may be selectively closed.

2. Prior Art

Electrical systems, particularly in computer and telecommunications applications, are often provided with consoles having a number of electrical switches which can be selectively set manually by a human operator. In telephone repertory dialing equipment, for example, telephone numbers stored in electronic memory can be automatically dialed by the selective closing of switch contacts associated with each stored telephone number. Heretofore, each telephone number in memory has been identified on a list provided on the housing of the repertory dialer, and each number has been provided with a multicontact pushbutton which is depressed for effecting the automatic dialing of the corresponding telephone number.

Since one manual switch is required for each number, the spacing of telephone numbers in the list must be positioned to accommodate the pushbutton. Further, the requirement for a plurality of pushbuttons may increase the cost and complexity of the assembly of the equipment. Additionally, the arrangement of buttons can detract from the aesthetics of the telephone equipment.

SUMMARY OF THE INVENTION

An object of the invention is improved switch actuation means for selectively closing a plurality of switch contacts.

Another object of the invention is an improved switch actuator for use with a visual list of codes whereby switches associated with each code can be manually closed.

A feature of the invention is sliding contact selector means which can be manually positioned to identify a particular code and engage one or more contacts associated therewith.

Briefly, electrical apparatus in accordance with the invention includes a plurality of switch contacts arranged in a row. Rail means is mounted in close proximity to the row of switch contacts and is yieldably biased away from the contacts. Selector means is slidably supported on the rail means with at least one contact engaging surface depending therefrom, the contact engaging surface normally being spaced from the contacts but engaging a contact upon depression of the selector means and rail means. To facilitate the positioning of the selector means with each code on the list, the selector means may be provided with a colored indicator surface, and an aperture is provided in association with each code on the list whereby the colored indicator surface is visible through an aperture when the selector means is positioned for engaging switch contacts associated with the corresponding code.

More particularly, each code in the list may have a plurality of corresponding contacts, and the selector means will have a corresponding number of contact engaging surfaces.

The invention and objects and features thereof will be more fully understood from the following detailed description and appended claims when taken with the drawing.

DETAILED DESCRIPTION OF THE ILLUSTRATED EMBODIMENT

Telephone repertory dialers are commercially available today and have the capability of allowing an operator to manually dial a telephone number of automatically dial a telephone number through use of an electronic memory wherein telephone numbers can be stored. A stored telephone number is automatically dialed by the closing of selected switches associated therewith. Heretofore, a multicontact pushbutton switch typically has been provided for each telephone number stored in memory and automatic dialing of the telephone number is accomplished by depressing a pushbutton switch which is associated with the desired telephone number.

Figure 1:
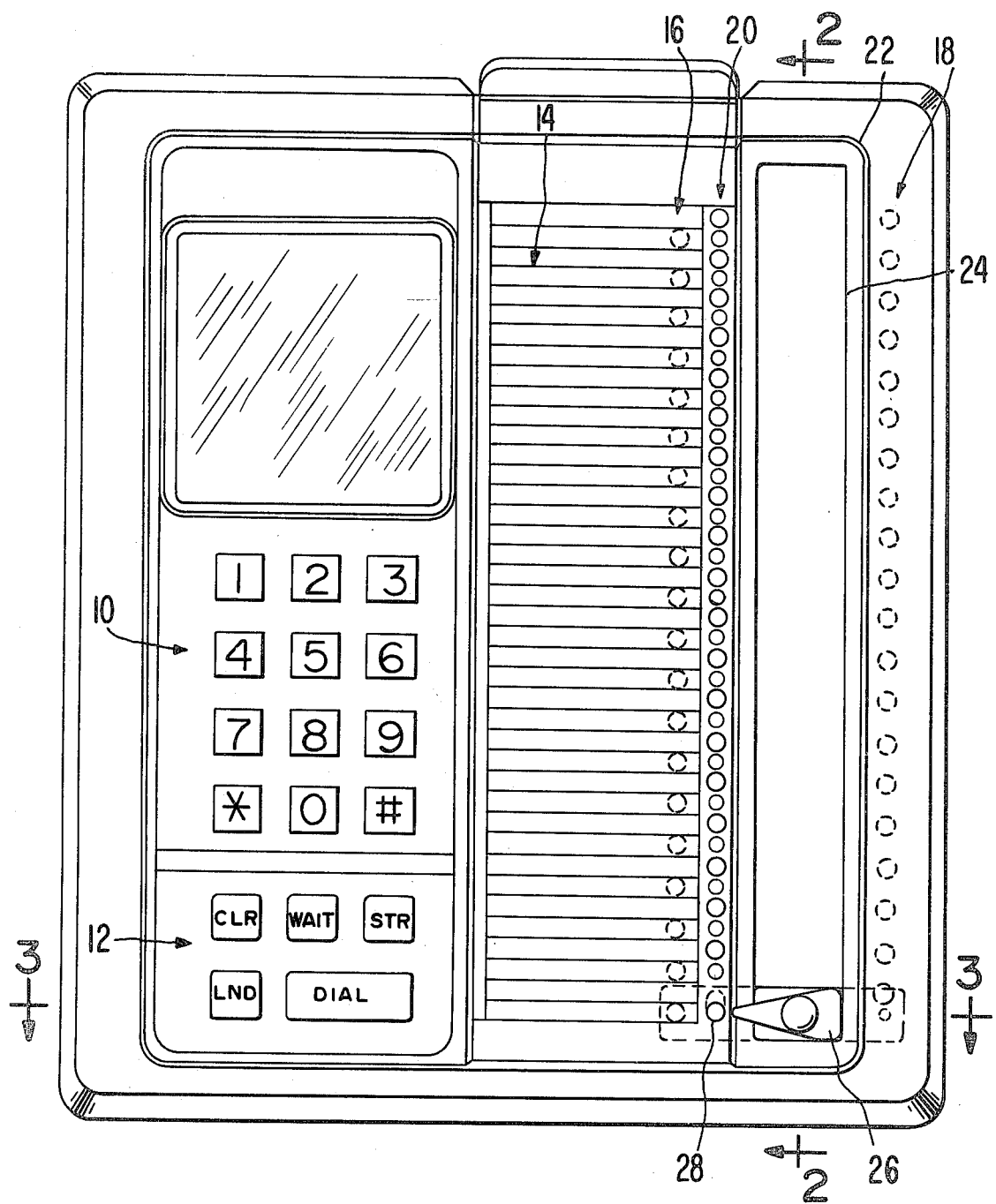
FIG. 1 is a plan view of a telephone repertory dialer including switch actuation means in accordance with the present invention.

FIG. 1 is a plan view of a telephone repertory dialer which includes switch actuation means in accordance with the present invention. The dialer includes a keyboard shown generally at 10 for manually dialing a number or for programming and storing numbers in the electronic memory of the dialer. A number of other keys shown generally at 10 for manually dialing a number or for programming and storing numbers in the electronic memory of the dialer. A number of other keys shown generally at 10 provide special functions including CLR (memory clearing), WAIT (to program the positions and durations of pauses during the dialing of access codes), STR (for storing a number in memory), LND (for redialing the last number dialed which may be stored in a scratch pad memory) and DIAL (to dial a newly entered number). Since these functions are not related to the present invention, no further description of the functions thereof need be given.

The telephone numbers stored in memory are identified on a listing 14 for automatic dialing purposes. Associated with alternating numbers in the list are a plurality of contacts shown generally in row 16, and associating with other alternating numbers in the list 14 are switch contacts arranged in a second row 18. The switch contacts are hidden from view and are shown generally by dotted lines. Two rows of contacts are provided so that the numbers in list 14 can be spaced more closely together. Also provided in association with the numbers in list 14 is a row of apertures shown generally at 20 in the housing for the dialer which provides an indication of a number selected for automatic dialing, as will be described further hereinbelow.

A slot 22 is provided between the row of contacts 16 and 18, and yieldably mounted therein is a rail member 24 on which a contact selector member 26 is slidably supported. Selector 26 includes a surface 28 which is preferably painted a distinguishing color whereby the surface is visible through an aperture in the row 20 as the selector member 26 is moved into position for selecting and automatically dialing an associated telephone number in list 14.

Operation of the switch actuator includes sliding the selector member 26 to a desired telephone number, as indicated by the surface 28 being visible through an aperture in row 20, and depressing the selector 26 and rail 24 whereby the selector engages electrical contacts in the housing to effect the automatic dialing.

Figure 2:
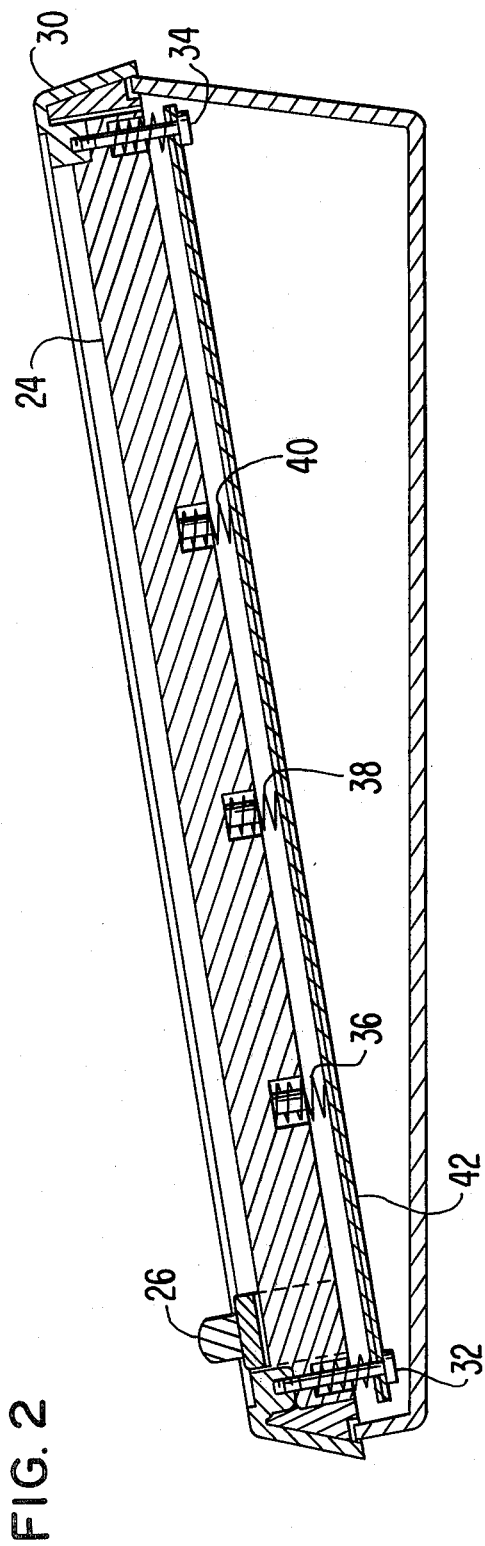
FIG. 2 is a side view in section of the apparatus in FIG. 1 illustrating the switch actuation means in accordance with the invention.

FIG. 2 is a side view in section of the dialer illustrated in FIG. 1 taken along lines 2—2 and further shows the movable mounting of rail 24 in housing 30 by means of screws 32 and 34 at either end of the rail member. Springs are provided in conjunction with screws 32 and 34, and also at 36, 38, and 40 to yieldably bias the rail in a raised position. However, by depressing selector 26 the rail will move downwardly towards a printed circuit board 42 which supports electronic components including switch contacts of the repertory dialer.

Figure 3:
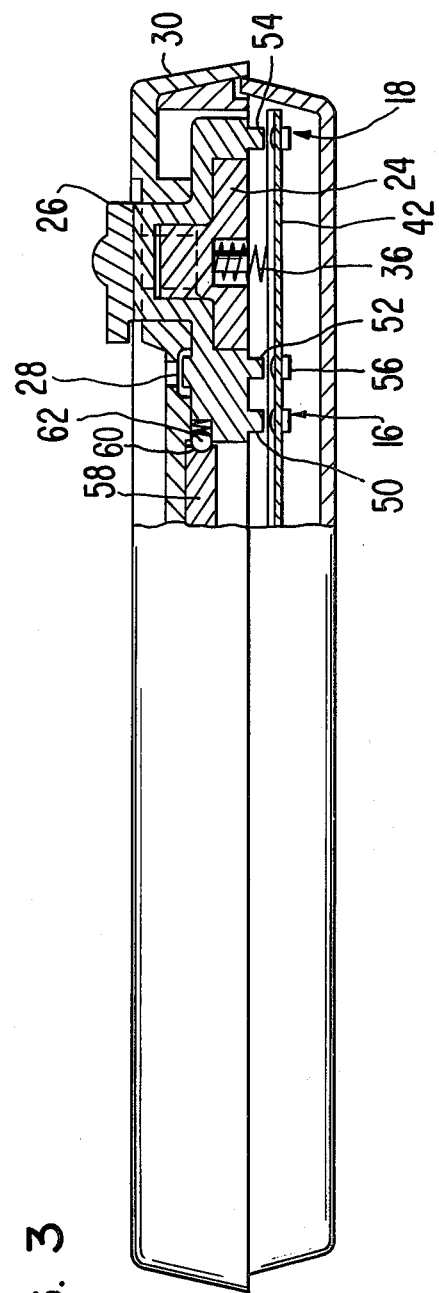
FIG. 3 is a front view partially in section of the apparatus in FIG. 1 further illustrating the switch actuation means in accordance with the invention.

Referring now to FIG. 3, a front view partially in section of the dialer illustrated in FIG. 1 further illustrates the cooperative relationship of selector 26 and rail 24 with the row of contacts 16 and 18. Rail 24 is shown in the upward biased position by means of the springs such as spring 36, and selector 26 is slidably mounted thereon with a generally conforming surface abutting rail 24 whereby depression of the selector also depresses rail 24. Selector 26 includes contact engaging surfaces 50, 52 and 54 for engaging the contacts in row 16 and 18 and a common contact 56 for all switch positions. The colored surface 28 extends upwardly from the body of selector 26 for viewing through an aperture in the row 20 upon proper positioning of the selector for a particular telephone number.

To further facilitate the proper positioning of selector 26 for a desired telephone number to be dialed, the housing includes a platen 58 which includes a cam surface 60 with an undulation in association with each set of contacts for a stored telephone number whereby a ball in cage 62 within the selector member 26 follows the cam surface 60 of the platen 58 and mates with an undulation for each stored telephone number.

Thus, by sliding the selector 26 to the desired telephone number to be dialed, as indicated by the colored surface of indicator 28 and depressing selector 26 and rail 24 a set of contacts is closed to effect the automatic dialing of the number. Since the contacts are provided in a plurality of rows, the telephone numbers can be more closely spaced. The switch actuation apparatus is more aesthetically pleasing, particularly for telephone dialing equipment, and the structure eliminates the need for a plurality of pushbuttons.

While the invention has been described with reference to a specific embodiment, the description is illustrative and not to be construed as limiting the scope of the invention. Various modifications, changes, and applications may occur to those skilled in the art without departing from the true spirit and scope of the invention as defined by the appended claims.

What is claimed is:

1. In electrical apparatus having a plurality of switch contacts which are selectively closed, switch actuation means comprising rail means mounted in close proximity to a row of switch contacts and yieldably biased away from said contacts, and selector means slidably mounted on said rail means with at least one contact engaging surface depending therefrom, said contact engaging surface normally being spaced from said contacts and engaging a contact upon depression of said selector means and said rail means.

2. Switch actuation means as defined by claim 1 wherein said electrical apparatus includes a visual list of codes and each code has at least one corresponding switch contact, and said selector means includes an indicator means for identifying a particular code as said selector means is slid along said rail means.

3. Switch actuation means as defined by claim 2 wherein said selector means includes a plurality of contact engaging surfaces whereby a plurality of switch contacts may be engaged for each code.

4. Switch actuation means as defined by claim 3 wherein said electrical apparatus comprises a telephone repertory dialer and said visual list of codes is telephone numbers which can be automatically dialed upon engagement of said plurality of switch contacts for each telephone number.

5. Switch actuation means as defined by claim 4 wherein said plurality of switch contacts is arranged in a plurality of rows, whereby said selector means may contact at least one contact in each row.

6. Switch actuation means as defined by claim 5 wherein first alternating telephone numbers in said list have contacts in a first row and second alternating numbers in said list have contacts in a second row, and said selector means has a first contact engaging surface for engaging switch contact in said first row and a second contact engaging surface engaging a switch contact in said second row.

7. Switch actuation means as defined by claim 6 wherein all telephone numbers in said list have switch contacts in a third row and said selector means has a third contact engaging surface for engaging a switch contact in said third row.

8. Switch actuation means as defined by claim 7 wherein said selector means includes a colored indicator surface, and said electrical apparatus has an aperture associated with each telephone number in said list of telephone numbers whereby said colored indicator surface is visible in an aperture when said selector means is positioned for engaging a switch contact associated with the corresponding telephone number.

9. Switch actuation means as defined by claim 2 wherein said selector means includes a colored indicator surface, and said electrical apparatus has an aperture associated with each code in said visual list whereby said colored indicator surface is visible in an aperture when said selector means is positioned for engaging a switch contact associated with the corresponding code.

10. Switch actuation means as defined by claim 1 wherein said selector means includes a plurality of contact engaging surfaces and a plurality of switch contacts may be engaged upon depression of said selector means and said rail means.

11. In a telephone repertory dialer including a keyboard for manually encoding a telephone number to be dialed and having memory means for storing telephone numbers for automatic dialing, said telephone repertory dialer having a housing which includes a list of said stored telephone numbers for automatic dialing, means for selecting a stored telephone number and effecting the automatic dialing thereof, comprising a first plurality of contacts arranged in a row with each contact corresponding to a stored telephone number, rail means mounted in close proximity to said row of contacts and yieldably biased away therefrom, and selector means slidably supported on said rail means with at least one contact engaging surface depending therefrom, said contact engaging surface normally being spaced from said contacts and engaging a contact upon depression of said selector means and said rail means.

12. Means as defined by claim 11 wherein said selector means includes an indicator for identifying a particular telephone number as said selector means is slid along said rail means.

13. Means as defined by claim 11 and further including a second plurality of contacts arranged in a row with each contact corresponding to a stored telephone number, and said selector means including a second contact engaging surface for engaging a contact in said second plurality of contacts.

14. Means as defined by claim 13 wherein said indicator includes a colored surface, and said telephone repertory dialer has an aperture associated with each telephone number in said list of telephone numbers whereby said colored surface is visible in an aperture when said selector means is positioned for engaging said switch contacts associated with the corresponding telephone number.

15. Means as defined by claim 14 wherein said dialer includes platen means with a cam surface having depressions corresponding to stored telephone numbers on said list, and said selector means includes cam follower means for engaging said depressions and detecting the position of a telephone number on said list.

16. Means as defined by claim 11 wherein said dialer includes platen means with a cam surface having depressions corresponding to stored telephone numbers on said list, and said selector means includes cam follower means for engaging said depressions and detecting the position of a telephone number on said list.

17. Means as defined by claim 16 wherein said cam follower comprises a ball in cage.

* * * * *